United States Patent
Li et al.

(10) Patent No.: US 7,554,914 B1
(45) Date of Patent: Jun. 30, 2009

(54) SYSTEM AND METHOD FOR ADAPTIVELY BALANCING NETWORK TRAFFIC OVER ROUTER OUTPUT PORTS

(75) Inventors: Anthony J. Li, San Mateo, CA (US); William L. Lynch, La Honda, CA (US)

(73) Assignee: Cisco Technology, Inc., San Jose, CA (US)

( * ) Notice: Subject to any disclaimer, the term of this patent is extended or adjusted under 35 U.S.C. 154(b) by 953 days.

(21) Appl. No.: 10/396,192

(22) Filed: Mar. 24, 2003

Related U.S. Application Data (60) Provisional application No. 60/395,185, filed on Jul. 10, 2002.

(51) Int. Cl.
*H04L 12/56* (2006.01)
(52) U.S. Cl. .................... 370/235; 370/418; 370/437
(58) Field of Classification Search .................. None
See application file for complete search history.

(56) References Cited

U.S. PATENT DOCUMENTS

| | | | | |
|---|---|---|---|---|
| 4,621,359 | A * | 11/1986 | McMillen | 370/235 |
| 6,252,849 | B1 * | 6/2001 | Rom et al. | 370/230 |
| 6,320,864 | B1 * | 11/2001 | Hebb et al. | 370/412 |
| 6,359,879 | B1 * | 3/2002 | Carvey et al. | 370/351 |
| 6,553,005 | B1 * | 4/2003 | Skirmont et al. | 370/285 |
| 6,614,758 | B2 * | 9/2003 | Wong et al. | 370/232 |
| 6,667,975 | B1 * | 12/2003 | DeJager et al. | 370/389 |
| 6,807,179 | B1 * | 10/2004 | Kanuri et al. | 370/395.31 |
| 6,967,924 | B1 * | 11/2005 | Aimoto | 370/235 |
| 7,068,602 | B2 * | 6/2006 | Davari et al. | 370/232 |
| 2002/0101919 | A1 * | 8/2002 | Takada et al. | 375/225 |

\* cited by examiner

*Primary Examiner*—Hong Cho
*Assistant Examiner*—Brian Roberts
(74) *Attorney, Agent, or Firm*—Schwegman, Lundberg & Woessner, P.A.

(57) ABSTRACT

A method and system for determining an output port upon which to transmit a packet in a router having a plurality of output ports adapted to be coupled with an adjacent router. In one embodiment, a list is created of output ports that are coupled with the adjacent router, and the list is modified based on network traffic. A port is selected from the list of ports, and the packet is transmitted over the selected port. In one example, the list is modified continuously as a background process based on network traffic. The list may be modified by determining a port which is under-utilized, determining a port which is over-utilized, and substituting in the list one or more instances of the port which is over-utilized with one or more instances of the port which is under-utilized. In this manner, a router can adaptively and evenly distribute the packet transmission traffic over the output ports.

14 Claims, 6 Drawing Sheets

SYSTEM AND METHOD FOR ADAPTIVELY BALANCING NETWORK TRAFFIC OVER ROUTER OUTPUT PORTS

CROSS REFERENCE TO RELATED APPLICATION

This application claims the benefit under 35 U.S.C. 119(e) of U.S. provisional patent application Ser. No. 60/395,185 filed Jul. 10, 2002, entitled "SYSTEM AND METHOD FOR ADAPTIVELY BALANCING NETWORK TRAFFIC OVER ROUTER OUTPUT PORTS," the disclosure of which is hereby incorporated by reference in its entirety.

TECHNICAL FIELD

This application relates, in general, to network devices such as routers, and more specifically to methods for balancing network traffic over router output ports.

BACKGROUND

Communication networks include a number of devices, such as routers, which are interconnected to one or more other devices in the network so that a message may be transmitted from a source to a destination. Oftentimes, a router in a network may be connected with another router in the network over an interface having multiple ports or links so that the interface can support bandwidth requirements or particular data rates.

Figure 1:
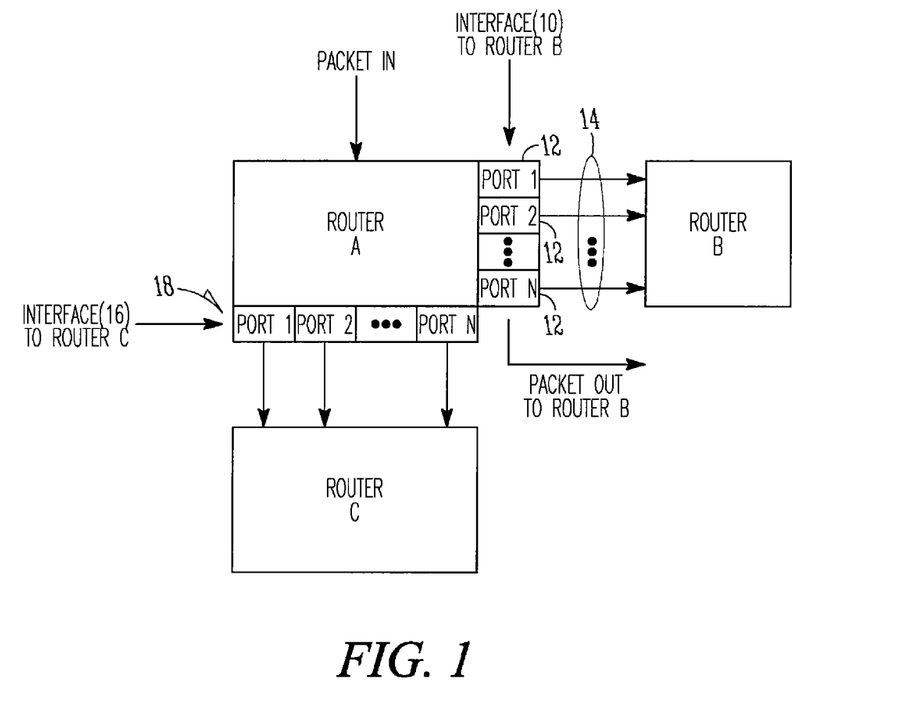
FIG. 1 illustrates a block diagram of a router having multiple ports coupled to adjacent or "next-hop" routers in a network.

For instance, in the example of FIG. 1, Router A has an interface 10 with a plurality of ports or links 12 which connect with Router B in order to pass data from Router A to Router B, in this example. When a packet from Router A needs to be transmitted to Router B, Router A determines which port of the plurality of ports 12 should be used to transmit the packet to Router B. Conventionally, a hash operation or function may be used to generate an index into the plurality of ports of Router A. For instance, a hashing function may be performed using the destination address of the packet to generate an index, and unneeded bits may be masked off in order to form an index which is used to select one of the plurality of ports 12 of the interface 10 of Router A upon which to transmit the packet.

As recognized by the present inventors, such a process is a static process which is not sensitive to the amount of traffic being handled by particular ports 12 of Router A. In other words, if an amount of traffic builds up on one or more ports 12 of Router A, the above-described hash function does not account for such traffic build-ups in determining which port of interface 10 should be utilized to transmit a packet. As recognized by the present inventors, this problem may be compounded when adjacent routers are of the same make and model and use the same hashing function, such that a build-up of traffic on a particular port in Router A may be propagated and compounded onto a corresponding port of Router B, which degrades the overall performance of Router A and Router B in the network.

Further, as recognized by the present inventors, TCP/IP performance may be degraded if the packet order is disrupted, for example, if Router A were to use a random number algorithm to select a port from the plurality of ports of the interface upon which to transmit a packet.

As recognized by the present inventors, what is needed is a system and method for selecting an output port or link of an interface of a router to transmit a packet upon so that each port of the interface is being used in a balanced and substantially even manner.

It is against this background that various embodiments of the present invention were developed.

SUMMARY OF THE INVENTION

In light of the above and according to one broad aspect of one embodiment of the present invention, disclosed herein is a method for determining an output port upon which to transmit a packet in a router having a plurality of output ports adapted to be coupled with an adjacent router. The method includes creating a list of output ports that are coupled with the adjacent router, modifying the list based on network traffic, selecting a port from the list of ports, and transmitting the packet over the selected port. In one example, the list is continuously modified as a background process based on network traffic. The list may be modified by determining a port which is under-utilized, determining a port which is over-utilized, and substituting in the list one or more instances of the port which is over-utilized with one or more instances of the port which is under-utilized. In this manner, the router can adaptively and evenly distribute the packet transmission traffic over the output ports of an interface.

In one embodiment, the operation of determining a port which is under-utilized may include measuring a transmission rate for each of the ports in the list and determining a port which has the lowest transmission rate. Alternatively, for each port in the list, a queue may be provided for each instance of a port being referenced in the list, and the operation of determining a port which is under-utilized may include examining the extent to which each queue of a port is empty.

In another embodiment, the operation of determining a port which is over-utilized may include measuring a transmission rate for each of the ports in the list and determining a port which has the highest transmission rate. Alternatively, for each port in the list, a queue may be provided for each instance of a port being referenced in the list, and the operation of determining a port which is over-utilized may include examining the extent to which each queue of a port is full.

In one example, the operation of selecting a port from the list of ports may include performing a hash operation using a destination address of the packet to generate an index value into the list, and selecting a port from the list based on the index value.

According to another broad aspect of another embodiment of the invention, disclosed herein is a method for determining an output port upon which to transmit a packet in a router having a plurality of output ports adapted to be coupled with an adjacent or "next-hop" router. The method includes creating a list of output ports that are coupled with the adjacent router; updating the list based on network traffic over the output ports; extracting a destination address from the packet; performing a hash function using the destination address to create an index into the list; at the location of the index in the list, extracting an identifier of an output port; and transmitting the packet over the output port.

In one example, the updating operation may include determining a port of the list of ports which is under-utilized; determining a port of the list of ports which is over-utilized; and substituting in the list one or more instances of the port which is over-utilized with one or more instances of the port which is under-utilized.

According to another embodiment, disclosed herein is a router having at least a first and second output port. The router includes at least one queue for the first output port, the at least one queue for storing packets to be transmitted along the first output port; at least one queue for the second output port, the at least one queue for storing packets to be transmitted along the second output port; a rate counter for measuring transmission rates along the first and second output ports; and means for determining upon which output port a packet should be transmitted. The means for determining may include means for creating a list of output ports that are coupled with the adjacent router, the list including the first and second output ports; and means for continuously modifying the list based on network traffic.

In one example, the means for continuously modifying the list may include means for determining whether the first port is under-utilized; means for determining whether the second port is over-utilized; and means for substituting in the list one or more instances of the second port which is over-utilized with one or more instances of the first port which is under-utilized.

Various embodiments of the present invention may be embodied as a computer program products including computer usable medium and computer readable code embodied on the computer usable medium, the computer readable code including computer readable program code devices configured to cause the computer to perform or effect one or more of the operations described herein.

The features, utilities and advantages of various embodiments of the invention will be apparent from the following more particular description of embodiments of the invention as illustrated in the accompanying drawings.

DETAILED DESCRIPTION

According to one broad aspect of the invention, disclosed herein is a system and method for determining an output port upon which to transmit a packet in a router having a plurality of output ports adapted to be coupled with an adjacent router. As will be discussed below, in one embodiment, a list is created of output ports that are coupled with the adjacent router, and the list is modified based on network traffic. A port is selected from the list of ports, and the packet is transmitted over the selected port. In one example, the list is modified continuously as a background process based on network traffic. The list may be modified by determining a port which is under-utilized, by determining a port which is over-utilized, and substituting in the list one or more instances of the port which is over-utilized with one or more instances of the port which is under-utilized. In this manner, a router can adaptively and evenly distribute the packet transmission traffic over the output ports. Various embodiments of the invention will now be discussed.

Referring to FIG. 1, a Router A is shown having an interface 10 with a plurality of ports which connect Router A with Router B over a plurality of connections, lines, wires, links or bundled links 14. The ports 12 of Router A are configured to permit transmission of packets from Router A to Router B, and these ports 12 may be referred to as output ports, egress ports, links, or the like. As shown in FIG. 1, port 1 to port N may be connected with Router B, and there may be additional interfaces 16 having ports 18 connected with other routers in the network. When a packet is received by Router A, Router A determines whether the received packet should be transmitted to Router B or to other routers connected to Router A, based in part upon the destination address of the packet. If a packet is to be transmitted from Router A to Router B, then Router A may transmit this packet over the one of the ports 12 shown in FIG. 1.

Figure 2:
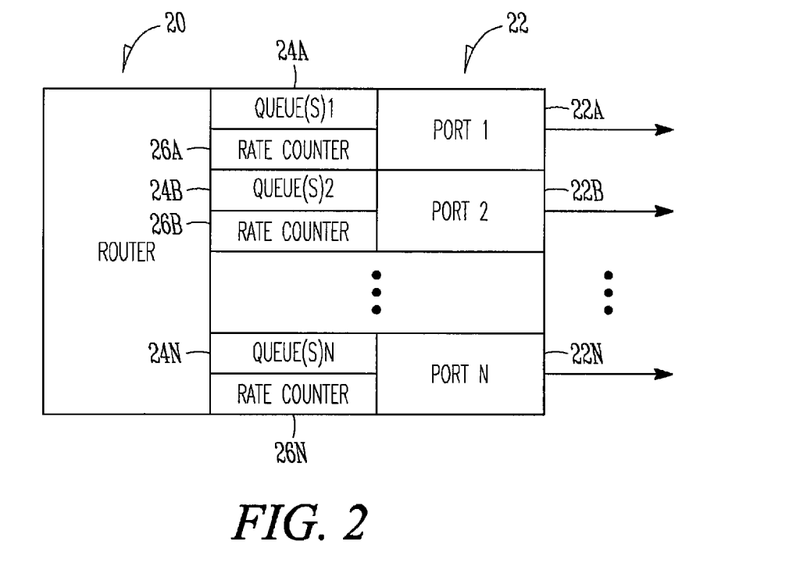
FIG. 2 illustrates a block diagram of a router having multiple ports, queues, and rate counters, in accordance with an embodiment of the present invention.

Referring now to FIG. 2, FIG. 2 illustrates a block diagram of a router 20 in accordance with one embodiment of the present invention. The router 20 has a plurality of ports 22 (shown as 22A, 22B . . . 22N) and for each port, the router is provided with one or more queues (shown as 24A, 24B . . . 24N) corresponding to that port for storing packets to be transmitted over that port. A rate counter—shown as 26A, 26B . . . 26N—may be also provided or associated with each port to track or measure the rate at which data is being transmitted over a respective port.

Each queue 24A, 24B, 24N may be a single queue having depth to temporarily store multiple packets for transmission over a port, or as explained with reference to FIGS. 7-9, the queues associated with a port may include multiple sets of queues.

Figure 3:
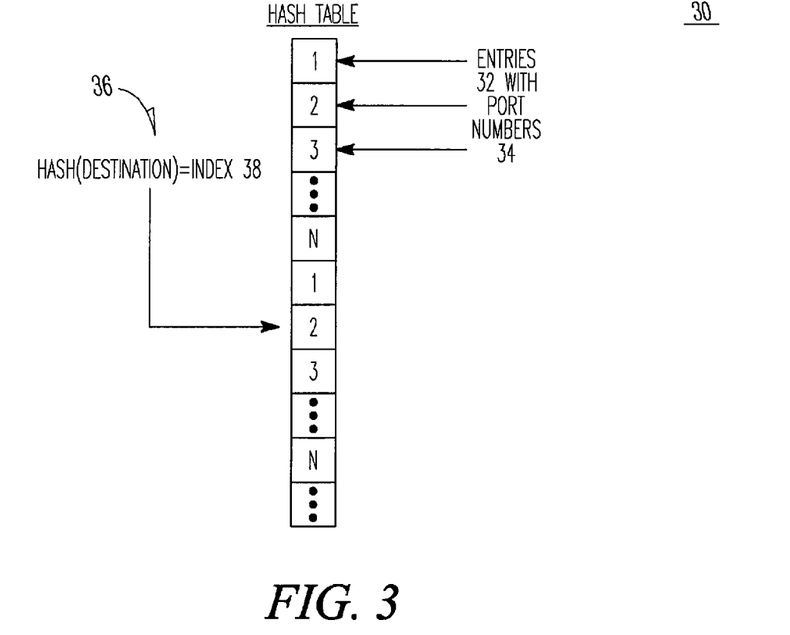
FIG. 3 illustrates an example of a data structure or hash table, in accordance with one embodiment of the present invention.

In FIG. 3, a data structure or table 30 such as a hash table is shown, in accordance with one embodiment of the present invention. In the example of FIG. 3, the table 30 includes a plurality of entries 32 which in one embodiment, are filled with the port numbers 34 of the ports of the router. In this example, assuming that there are N ports of Router A which are coupled with Router B, then the table contains as entries 32 the port numbers 1 to N. The size of the table is a matter of choice, and in one example, contains 65,536 entries to support 16-bit addressing.

In one example, the destination address 36 of the packet to be transmitted is used as the operand of a hash operation. In general, a hashing function is an operation which produces a unique numeric value based upon a given operand. The result of this operation is used as an index 38 into the table 30 shown in FIG. 3, and the port number 34 contained within the entry 32 indexed is utilized to transmit the packet out of the router. In one example, the hash operation generates a 16-bit result, and in this example, the table 30 is sized to support 65,536 entries. In one example, the table 30 is filled with port numbers 34 in a sequential manner, such as shown in FIG. 3. It is understood that the length of the table 30 is a matter of choice depending upon the particular implementation. Further, it is understood that while a 16-bit result from the hash operation may be used in on example, a portion of the 16-bit result may be masked off to form a result of less than 16 bits, if desired, or a larger address range may be used.

Figure 4:
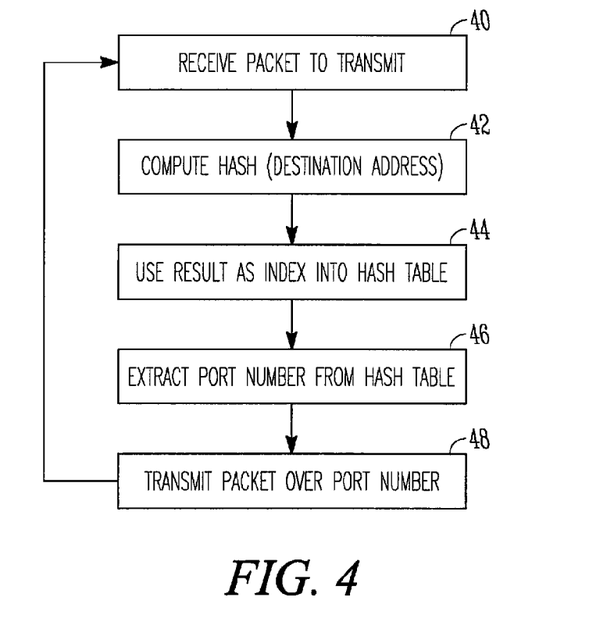
FIG. 4 illustrates an example of logical operations for selecting an output port of a router to transmit a packet thereon.
Figure 5:
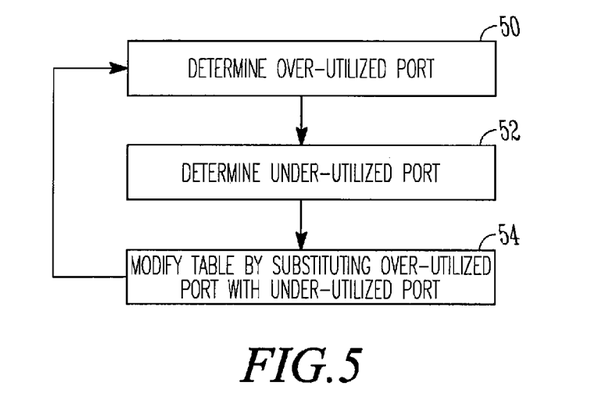
FIG. 5 illustrates an example of logical operations for modifying the contents of the table of FIG. 3 based on network traffic, in accordance with one embodiment of the present invention.

FIGS. 4-5 illustrate examples of logical operations for determining an output port to transmit a packet along to a next hop or adjacent router in a network. In FIGS. 4-5, it is assumed that the router has already determined that the packet should be forwarded to a particular adjacent router. For example, as shown in FIG. 1, it is assumed that Router A has sufficient information or has already determined that the packet received should be transmitted to Router B over one of the plurality of ports; and the operations of FIGS. 4-5 may be employed in whole or in part by Router A in order to determine which ports coupled with Router B should be utilized to transmit the packet upon.

In FIG. 4 at operation 40, a packet is to be transmitted to a particular adjacent router for "next hop" in the network over one or more ports of the router. For example, in FIG. 1, a packet is to be transmitted from Router A to Router B over one of the plurality of ports 12. In FIG. 4, at operation 42, a hash operation is performed using, in one example, the destination address of the packet. The result of the computation is used at operation 44 as an index into a table or data structure, such as the hash table 30 shown in the example of FIG. 3. In FIG. 4, at operation 46, a port number is extracted from the entry of the table indexed by operation 44. At operation 48, the packet is transmitted from the router along the ports identified by the port number extracted by operation 46. Operations 40-48, or various combinations thereof, may be repeated as needed to handle the transmission of multiple packets over the various ports between routers.

Referring to the example of FIG. 3, assuming that a packet has a destination address 36 which, upon performing a hash function yields an index 38 which points to the second entry in the table 30, the port number "2" is extracted from the table, and the packet is transmitted to the adjacent router in the network over port number 2, in this example. If another packet to be transmitted had a destination address 36 which, upon performing a hash operation, generates an index 38 pointing to the first entry in the hash table 30, then in this example the port number "1" is extracted from the table and the packet is transmitted to appropriate adjacent router using port number "1." These examples are provided for purposes of illustration only.

FIG. 5 illustrates an example of logical operations which modify the port numbers in the table 30 of FIG. 3 so as to account for network congestion and traffic experienced within the ports of the router. At operation 50, overutilized ports of the plurality of ports are determined. In one example, the amount of traffic waiting for that port is examined and used to determine whether the port is overutilized, such as by examining the extent to which one or more queues associated with a port are filled (see queues 24 of FIG. 2). In another example, a rate counter calculates a transmission rate for a particular port, and that transmission rate is used to determine whether the particular port is overutilized (see rate counters 26 of FIG. 2). For instance, if the rate counter indicates that a port has a very high transmission rate relative to other ports of the router, then the port may be overutilized.

At operation 52 of FIG. 5, any underutilized ports of the router are identified. In one example, underutilized ports may include the ports that have little or no traffic awaiting in the one or more queues associated with the port, or may include ports for which a rate counter indicates that the transmission rate for that port is lower than the transmission rate of other ports of the router. Information relating to queues 24 or rate counters 26 of FIG. 2 may be used in making this determination.

Upon determining the overutilized and underutilized ports of the router, operation 54 modifies the table 30 by substituting an overutilized port with an underutilized port. In one example, where a hash table 30 contains multiple entries having a port listed multiple times within the table, a single substitution of one instance of an overutilized port is made using an underutilized port. In this manner, the changes in the traffic between the overutilized and underutilized ports are made at a low rate so that the traffic is smoothly distributed across the ports.

The operations of FIG. 5 may be implemented within the router as background processes which continually repeat and continually monitor the network traffic over the output ports of the router.

Figure 6:
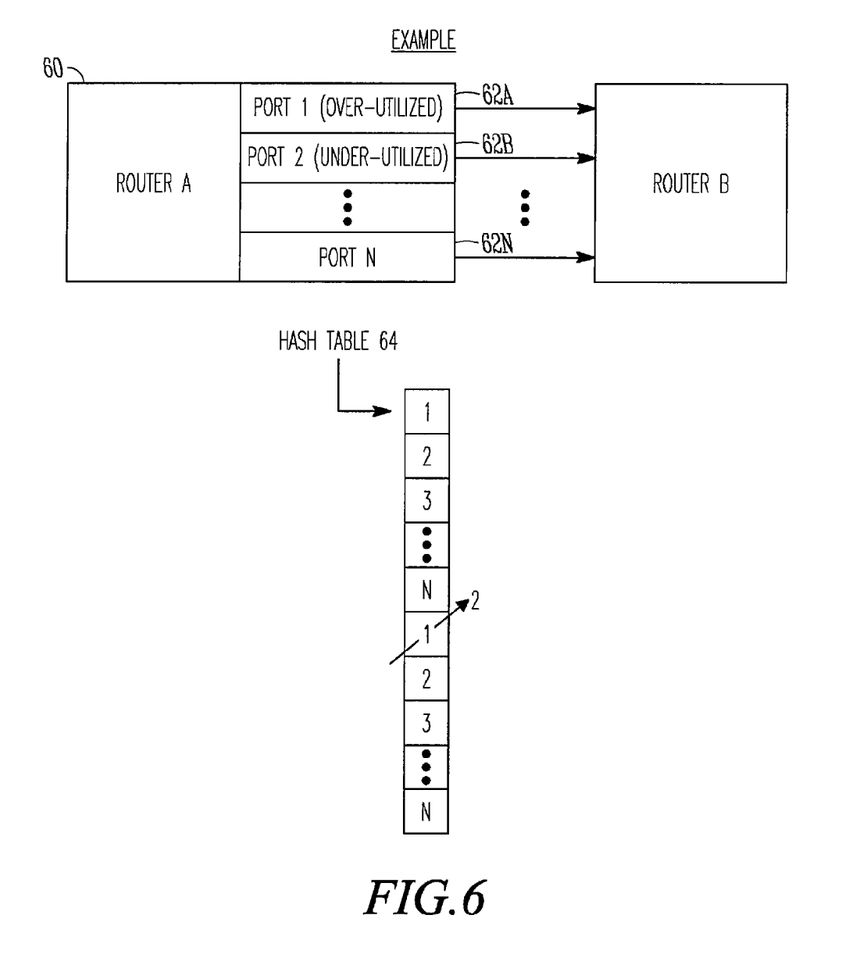
FIG. 6 illustrates an example of a router and a table as operated on by the operations of FIG. 5.

FIG. 6 illustrates an example of the operations of FIGS. 4 and 5. In FIG. 6, assuming that the router 60 has ports 62A, 62B, 62N for communicating with a particular adjacent router (shown as Router B), port 62A is shown to be determined to be an overutilized port, and port 62B is shown to have been determined to be an underutilized port. As mentioned above, these determinations may have been made based on transmission data rates or the extent to which queues associated with the ports are full or empty, in one example. Since, in this example, port 62A is overutilized and port 62B is under utilized, then in the table 64 of FIG. 6, an instance of port 62A is replaced with port 62B, as shown in FIG. 6 as "1" being replace by "2". In this manner, the amount of traffic transmitted over port 62A will decrease, on average, and the amount of traffic transmitted over port 62B will increase, on average, thereby resulting in a more balanced utilization of the plurality of ports connected between Router A and Router B, in this example.

Although FIG. 6 illustrates an example wherein an instance of an overutilized port is replaced by an underutilized port in one location within the table, it is understood that this substitution may occur in more than one location within the table, depending upon the particular implementation and the particular network traffic engineering constraints or parameters that may be involved.

Figure 7:
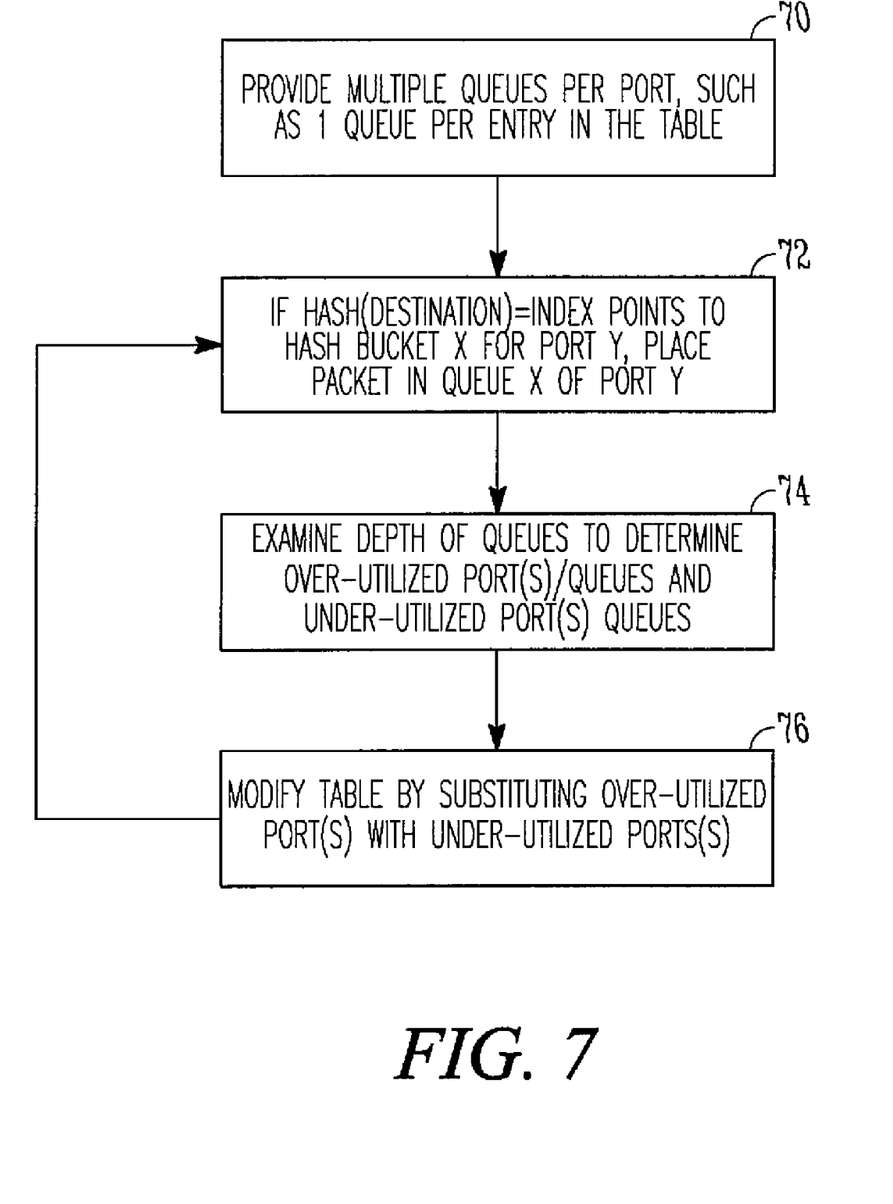
FIG. 7 illustrates an alternative embodiment of logical operations for selecting an output port of a router to transmit a packet thereon.
Figure 8:
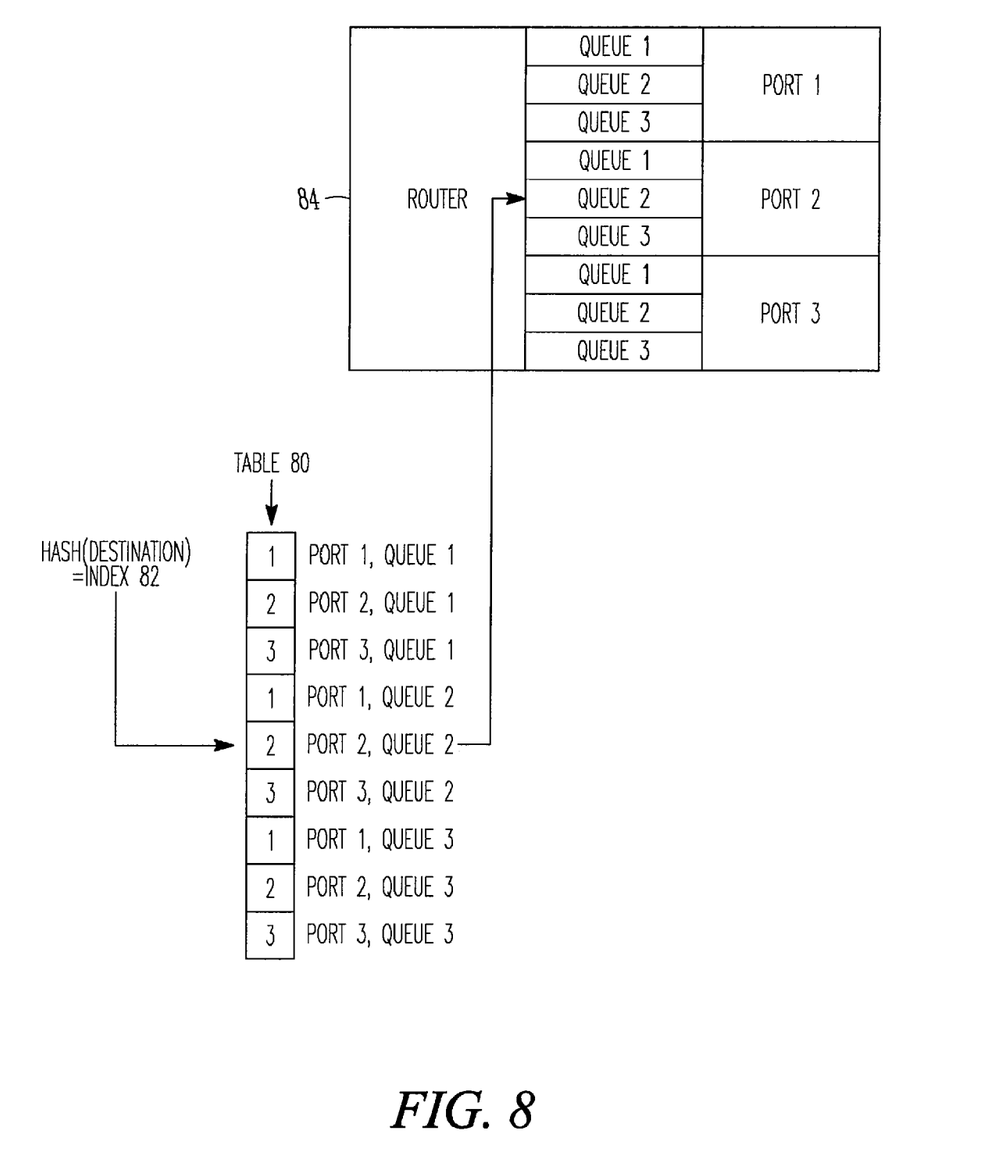
FIG. 8 illustrates an example of a router and a table in accordance with one embodiment of the present invention.
Figure 9:
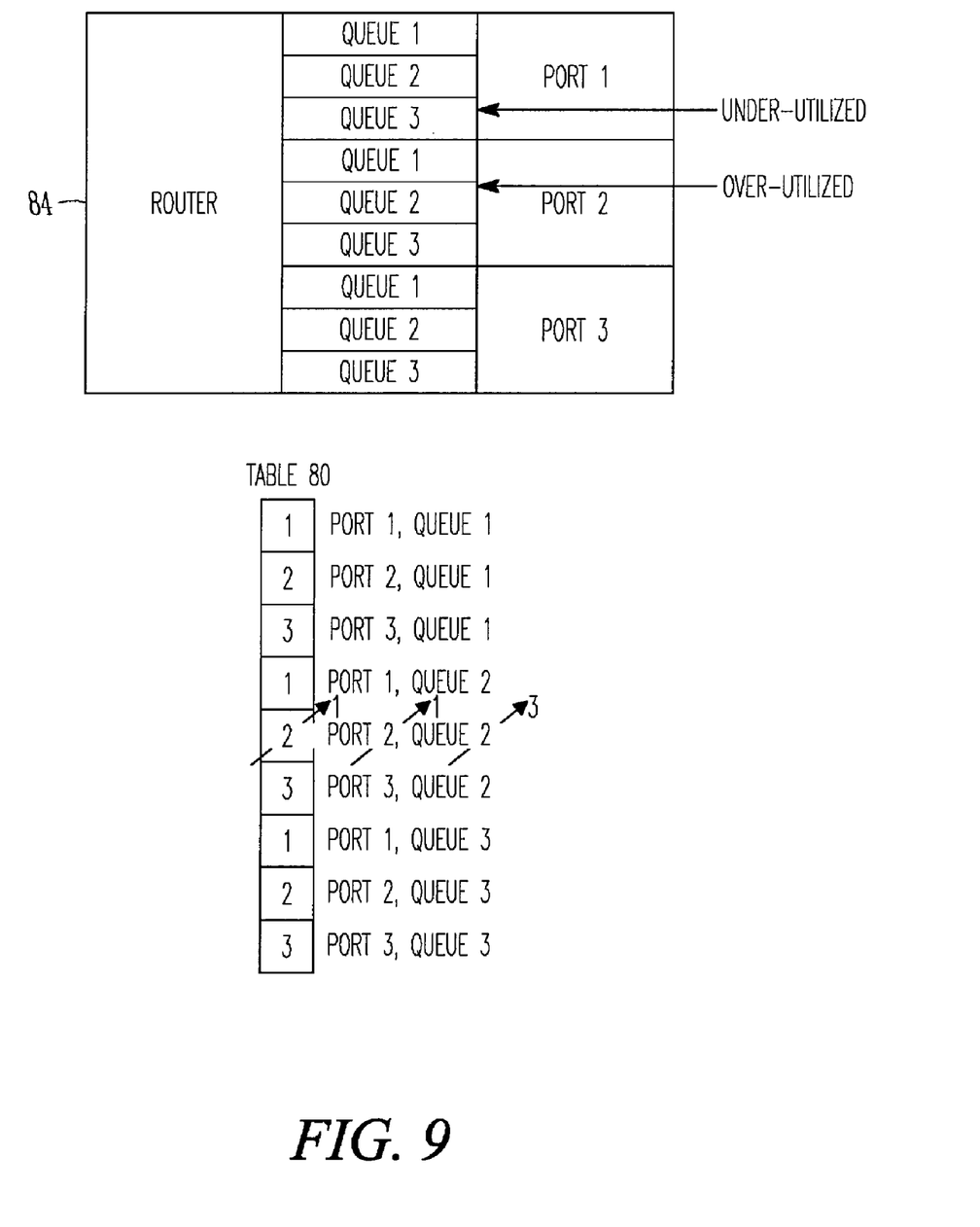
FIG. 9 illustrates an example of a router and a table as operated on by the operations of FIG. 7.

FIGS. 7-9 relate to an alternative embodiment of the present invention. In the embodiment of FIGS. 7-9, multiple queues are maintained for each port, and in one embodiment, the number of queues of each port corresponds to the number of entries in the table which refer to that port. For instance, as shown in FIG. 8, if the table 80 contains nine entries total, of which three of these entries correspond to port 1 of router 84, then three queues are maintained at port 1, as shown in FIG. 8. By maintaining a queue for each instance in which a port is listed in the table, the degree to which a queue is full or empty (i.e., the depth of the queue) for a given port can be used to determine which particular entry in the table should be removed and substituted with an underutilized port.

Referring to FIG. 7, at operation 70, multiple queues are provided for each port. In one example, for every entry in the table that refers to a particular port, a queue is maintained and associated with that entry. For example, as shown in FIG. 8, for port 2, there are three entries in the table 80 of FIG. 8, and accordingly, there are three queues for port 2. While the example of FIG. 8 shows a table having nine entries, it is understood that this table is provided by way of example only, and that the table may contain more or less entries depending upon the particular implementation. Further, while the router in FIG. 8 is shown as having three ports with three queues per port, it is understood that a router may have more or less than three ports with more or less than three queues per port, depending upon the particular implementation.

At operation 72 of FIG. 7, a hash operation is performed using, in one example, the destination address of the packet to be transmitted. The result of the hash operation generates an index into the table, and if the index points to an entry corresponding to a particular port, then the packet is placed in the corresponding queue of the particular port. For example and referring to FIG. 8, if the hash operation generates an index 82 which points to the fifth entry in the table 80 (shown as corresponding to port 2, queue 2), then the packet is placed in queue 2 of port 2 for transmission out of the router 84.

At operation 74 of FIG. 7, the depths of the queues (i.e., the extent to which the queues are full), are examined to determine which ports (and corresponding queues) are overutilized or are underutilized. Operation 74 may be implemented as a simple check of the amount of free memory available in the queues at a particular moment, thereby indicating which queue or queues have the maximum utilization and which queue or queues have the minimum utilization.

At operation 76, the table is modified by substituting the instance of an overutilized port with an underutilized port as determined by operation 74. Operations 74 and 76 may be continually performed as a background process within the router. Further, when a next packet needs to be transmitted along the output ports, operation 76 may pass control to operation 72 to repeat operations 72-76, in one embodiment.

FIG. 9 illustrates an example of an implementation including the operations of FIG. 7, in accordance with one embodiment of the present invention. As shown in FIG. 9, the table 80 has nine entries wherein each port is referenced three times within the table. Therefore, three queues are maintained per port within the router 84, in this example. Assume that queue 3 of port 1 has been determined to be an underutilized port and queue 2 of port 2 has been determined to be an overutilized port, with respect to the other ports of the router 84. Accordingly, as shown in FIG. 9, the entry in the table 80 corresponding to queue 2 of port 2 (the overutilized port in this example) is replaced with an entry which points to queue 3 of port 1 (the underutilized port). In this manner, a greater amount of network traffic will be directed to queue 3, port 1, on average and a lesser amount of traffic will be directed to queue 2, port 2, on average.

Accordingly, it can be seen that various embodiments of the present invention provide for adaptive balancing of the traffic which is transmitted over a plurality of ports between adjacent or "next hop" routers in a network.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to various embodiments thereof, it will be understood by those skilled in the art that various other changes in the form and details may be made without departing from the spirit and scope of the invention.

We claim:

1. In a router having a plurality of output ports adapted to be coupled with an adjacent router, a method for determining an output port upon which to transmit a packet, the method comprising:
   creating a list of output ports that are coupled with the adjacent router, each of the output ports having a plurality of instances in the list, for each port in the list, providing a queue;
   modifying the list based on network traffic;
   selecting an instance of a port from the list of ports;
   transmitting the packet over the port corresponding to the selected instance; and
   wherein modifying the list includes,
      measuring a transmission rate for each of the ports having a plurality of instances in the list of ports using a rate counter, finding one or more instances of a second port which is over-utilized based on the measured transmission rate, finding one or more instances of a first port which is under-utilized based on the measured transmission rate, and substituting in the list one instance of the second port which is over-utilized with one instance of the first port which is under-utilized, at least one instance of the second port in the list being unmodified.

2. The method of claim 1, wherein the creating operation further comprises:
   creating a table having multiple entries, each entry containing an indicator corresponding to a port of the list of ports.

3. The method of claim 2, wherein the table is a hash table.

4. The method of claim 1 further including:
   determining one port which has the lowest transmission rate.

5. The method of claim 1 further including:
   determining one port which has the highest transmission rate.

6. The method of claim 1, wherein the selecting operation further comprises:
   performing a hash operation using a destination address of the packet, said hash operation generating an index value into the list; and
   selecting an instance of the port from the list of ports based on the index value.

7. The method of claim 1, wherein the modifying operation is a background process that occurs while the router distributes traffic over the output ports.

8. The method of claim 1, wherein the modifying operation is a continuous process.

9. In a router having a plurality of output ports adapted to be coupled with an adjacent router, a method for determining an output port upon which to transmit a packet, the method comprising:
   creating a list of output ports that are coupled with the adjacent router, each of the output ports having a plurality of instances in the list, for each port in the list, providing a queue;
   updating the list based on network traffic over the output ports;
   extracting a destination address from the packet;
   performing a hash function using the destination address to create an index into the list;
   at the location of the index in the list, extracting an identifier of an output port;
   transmitting the packet over the output port; and
   wherein updating the list includes,
      measuring a transmission rate for each of the output ports having a plurality of instances in the list of output ports using a rate counter, finding one or more instances of a second output port which is over-utilized based on the measured transmission rate, finding one or more instances of a first output port which is under-utilized based on the measured transmission rate, and substituting in the list one instance of the second port which is over-utilized with one instance of the first port which is under-utilized, at least one instance of the second port in the list being unmodified.

10. The method of claim 9 further including:
determining one port which has a lowest transmission rate.

11. The method of claim 9 further including:
determining one port which has a highest transmission rate.

12. A router having at least a first and second output port adapted to be coupled with an adjacent router, comprising:
   a first plurality of queues for the first output port, said first plurality of queues to store packets to be transmitted along the first output port;
   a second plurality of queues for the second output port, said second plurality of queues to store packets to be transmitted along the second output port;
   a rate counter to measure transmission rates along the first and second output ports; and
   a memory for storing a data structure used to determine upon which output port a packet should be transmitted, said data structure including,
      a list of output ports that are coupled with the adjacent router, the list including a plurality of instances of the first and second output ports; and
      wherein the router continuously modifies the list by substituting in the list one instance of the second port which is over-utilized with one instance of the first port which is under-utilized, at least one instance of the second port in the list being unmodified.

13. The router of claim 12, wherein the router determines whether the first port is under-utilized and to determine whether the second port is over-utilized.

14. A computer program product, comprising:
   a computer usable medium and computer readable code embodied on said computer usable medium for determining an output port upon which to transmit a packet in a router having a plurality of output ports adapted to be coupled with an adjacent router, the computer readable code comprising:
   computer readable program code configured to cause a computing device to effect a creating of a list of output ports that are coupled with the adjacent router, each of the output ports having a plurality of instances in the list, for each port in the list, providing a queue;
   computer readable program code configured to cause the computing device to effect a modifying of the list based on network traffic;
   computer readable program code configured to cause the computing device to effect a selecting of an instance of a port from the list of ports;
   computer readable program code configured to cause the computing device to effect a transmitting of the packet over the port corresponding to the selected instance; and
   wherein modifying the list based on network traffic includes computer readable program code configured to cause the computing device to effect a measuring of a transmission rate for each of the ports having a plurality of instances in the list of ports using a rate counter, finding one or more instances of a second port which is over-utilized based on the measured transmission rate, finding one or more instances of a first port which is under-utilized based on the measured transmission rate, and substituting in the list one instance of the second port which is over-utilized with one instance of the first port which is under-utilized, at least one instance of the second port in the list being unmodified.

\* \* \* \* \*